United States Patent Office 3,833,548
Patented Sept. 3, 1974

3,833,548
POLYAMIDES CONTAINING HYDANTOIN
GROUPS AND/OR DIHYDROURACIL GROUPS
Jurgen Habermeier, Pfeffingen, and Daniel Porret, Binningen, Switzerland, assignors to Ciba-Geigy Corporation, Ardsley, N.Y.
No Drawing. Filed Feb. 23, 1973, Ser. No. 335,214
Claims priority, application Switzerland, Mar. 7, 1972, 3,313/72
Int. Cl. C08g 20/20
U.S. Cl. 260—78 R    19 Claims

ABSTRACT OF THE DISCLOSURE

Polyamides containing hydantoin and/or dihydrouracil groups are obtained by polycondensing in known manner dicarboxylic acids which contain hydantoin or dihydrouracil groups, or derivatives of such dicarboxylic acids, with diamines which can also contain hydantoin or dihydrouracil groups. In general, the products are tough, elastic and flexible, and are suitable for the manufacture of fibres. They can also be used as thermoplastic adhesives. Low molecular types can be used as hardeners for epoxide resins or isocyanates.

---

The invention relates to polyamides containing hydantoin groups and/or dihydrouracil groups, in which the molecular residues originating from the dicarboxylic acids contain hydantoin groups or dihydrouracil groups and in which the carbonyl groups of the —NH.CO— bridges are bonded to methylene or ethylene groups.

British Pat. No. 1,223,457 has already disclosed polyamides containing hydantoin groups in which the molecular residues originating from the diamines contain the hydantoin groups in question. In these polyamides, the nitrogen atoms of the —NH.CO— groups are bonded to divalent aromatic radicals. Such known polyamides are relatively heat-stable. However, at the same time they suffer from a series of disadvantages. They are very brittle and materials manufactured from them show relatively unfavourable mechanical properties. They are only sparingly soluble in many organic solvents. For these reasons they can in most cases not be processed from solution, for example for the manufacture of cast films.

As a further disadvantage of these known polyamides it should be mentioned that their manufacture requires a very involved process and is very expensive.

German offenlegungsschrift 1,906,492 has disclosed oligomeric and polymeric hydantoins which contain 2 to 8 terminal carboxyl groups or radicals derived from carboxyl groups. This Offenlegungsschrift also states that such hydantoins are capable of further reaction because of the functional carboxylic acid derivatives present in them. In principle a polycondensation with organic diamines would be possible in those cases in which these oligomeric (or polymeric) hydantoins contain 2 terminal carboxyl groups or radicals derived from carboxyl groups. Such a polycondensation, which however is not proposed in the Offenlegungsschrift mentioned, when using the hydantoins containing 2 carboxyl groups, or 2 radicals derived from carboxyl groups, mentioned in the Offenlegungsschrift, admittedly also gives polyamides in which the molecular residues originating from the dicarboxylic acids contain hydantoin groups; the carbonyl groups of the —NH.CO—bridges in these polyamides are, however, bonded to aromatic radicals, that is to say not to methylene or ethylene groups, as in the case of the polyamides according to the invention. In one case (Example 17), exceptionally, a hydantoin is described, whereof a polycondensation with diamines would lead to polyamides in which the carbonyl groups of the —NH.CO— bridges would also be bonded to an aliphatic radical, (namely to pentamethylene). Such polyamides would however nevertheless differ considerably from the polyamides according to the invention since the hydantoin which would be the starting material in this case contains, on each hydantoin ring, a total of two ester groups which are functional with respect to amines. This would lead to extensive crosslinking during the polycondensation and ultimately to insoluble or sparingly soluble, high-melting polyamides which would thus be difficult to process.

The German Offenlegungsschrift cited above mentions, in its introduction, special polyhydantoins which are claimed by Belgian Pat. 711,591. However, it can be deduced from the further comments in German Offenlegungsschrift 1,906,492 that the high polymers derived from such polyhydantoins possess disadvantages such as, for example, low solubility and high viscosity of the solutions. The high polymers which are derived from the polyhydantoins according to Belgian Patent Specification 711,591 differ in their basic structure from the polyamides according to the present invention in that in the former case the chain molecule formation takes place via a N atom and a C atom of the hydantoin ring (3,5-linkage) whilst in the latter case it takes place via the two N atoms of the hydantoin ring (3,4-linkage). A further disadvantage of the polyhydantoins according to the cited Belgian Patent Specification which requires to be highlighted is that their manufacture is technically very involved and hence expensive. For this reason, also, the high polymers derived therefrom are not of practical interest.

Surprisingly, the polyamides according to the invention, containing hydantoin groups and/or dihydrouracil groups, are not brittle but elastic and flexible and display better mechanical properties than the above-mentioned known polyamides. They furthermore display the advantage, over the latter, that in most cases they possess better solubility in organic solvents and are therefore of more diverse applicability. Furthermore, they can be manufactured substantially more simply and with less effort.

The subject of the invention are polyamiides of the general formula

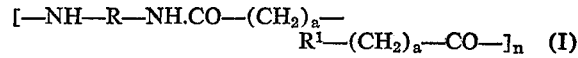

in which (1) $n$ denotes a number from 2 to 200 and $a$ denotes 1 or 2, (2) $R^1$ denotes a radical of the formula

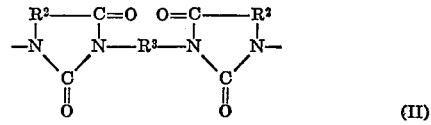

in which $R^2$ represents an optionally substituted methylene radical and $R^3$ represents an unbranched alkylene radical with 1 to 12 C atoms which optionally contains an ether bridge, or $R^1$ represents a radical of the formula

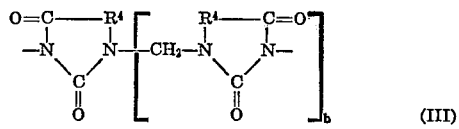

in which $b$ is 1 or 0 and $R^4$ represents a nitrogen-free divalent radical which is necessary to complete a five-membered or six-membered, unsubstituted or substituted ring, and (3) R denotes a divalent hydrocarbon radical with a total of 2 to 34 C atoms, which optionally contains one or more optionally substituted hydantoin groups or dihydrouracil groups and is optionally substituted.

If $R^1$ in the formula (I) denotes a radical of the formula (II), the latter is always a molecular radical containing two hydantoin rings. Such special polyamides represent a preferred form of this invention. In the formula (II), $R^2$ in particular denotes one of the radicals $$\diagdown CH_2, \quad \diagdown CH-\underset{\underset{CH_3}{|}}{\overset{CH_3}{|}}CH, \quad \diagdown C\diagup \underset{CH_3}{\overset{CH_3}{\diagdown}}, \quad \diagdown C\diagup \underset{CH_2-CH_2}{\overset{CH_2-CH_2}{\diagdown}} \quad \text{and}$$

$$\diagdown C \diagup \underset{CH_2-CH_2}{\overset{CH_2-CH_2}{\diagdown}} CH_2$$

$R^3$ preferably represents methylene, polymethylene with 2 to 12 carbon atoms or the $$—CH_2—CH_2—O—CH_2—CH_2—$$

radical.

If $R^1$ in the formula (I) denotes a radical of the formula (III), it can be either a radical containing one hydantoin ring or one dihydrouracil ring, of the formula $$\underset{-N\diagdown\underset{\overset{\|}{O}}{C}\diagup N-}{\overset{O=C-\!\!-\!\!-R^4}{|}} \qquad \text{(IV)}$$

or a radical containing two hydantoin rings or dihydrouracil rings, of the formula (III), in which $b$ denotes the number 1. Both possibilities represent further preferred forms of the invention.

Depending on whether $R^1$ according to the formula (III) contains dihydrouracil rings or hydantoin rings, $R^4$ in particular has the meaning of one of the radicals $$—CH_2, \diagdown C \diagup \underset{CH_3}{\overset{CH_3}{\diagdown}}_{CH_3} \quad \text{and} \quad \diagdown C \diagup \underset{CH-CH}{\overset{CH_3}{\diagdown}}_{CH_3}^{CH_3}$$

or the meaning of $R^2$ or of the radical $$\diagdown \underset{\text{⬡}}{C} \diagup H$$

In the formula (I), according to a preferred form of the invention, R represents an unbranched polymethylene radical with 2 to 10 carbon atoms, 2,2,4-trimethylhexamethylene, 2,4,4-trimethylhexamethylene or one of the radicals $$-\text{⬡}-, \quad -\text{⬡}_{(Cl)_4}-, \quad -\text{⬡}\!\!\diagup^H_H-,$$

$$-\text{⬡}\!\!\diagup^H_{CH_3}-CH_2-\text{⬡}\!\!\diagup^H_{CH_3}-$$

and $$-CH_2-\text{⬡}\!\!\diagup^{CH_3\ CH_3}_H\!\!\diagdown$$

A further preferred form of the invention is represented by polyamides which correspond to the formula (I) in which R represents a radical of the formula $$—(CH_2)_c—R^5—(CH_2)_c— \qquad \text{(V)}$$

in which $c$ denotes 2 or 3 and $R^5$ has the definition of $R^1$ and can in each case be the same as $R^1$ in the formula (I) or different from $R^1$ in the formula (I).

The new polyamides according to this invention in general have numerical average molecular weights of 500 to 50,000 and softening ranges from about room temperature to 250° C. In all cases where reference is made here and subsequently to molecular weights, numerical average molecular weights are to be understood, which are determined by the vapour pressure osmosis method. The softening range was in each case determined by means of the Kofler bench.

The properties of the new polyamides greatly depend on the nature of the starting components for their manufacture. In general, they are very tough, fibre-forming polymers. However, in case of a lower degree of polycondensation, the products can also be viscous at room temperature. In principle, it is also possible to set the conditions to give more brittle polycondensates.

The polyamides according to the invention are suitable for the manufacture of filaments and fibres. Coatings and other mouldings can also be manufactured from them. Because of their viscosity and the optional breadth of the melting range, they can also be used as thermoplastic adhesives. Low molecular grades can also be employed advantageously as hardeners agents for epoxide compounds or for isocyanates and as plasticisers for plastics.

A further subject of the invention is a process for the manufacture of new polyamides of the general formula $$[—NH—R—NH.CO—(CH_2)_a—R^1— \\ (CH_2)_a—CO—]_n \qquad (I)$$

in which (1) $n$ denotes a number from 2 to 200 and $a$ denotes 1 or 2, (2) $R^1$ denotes a radical of the formula $$\underset{-N\diagdown\underset{\overset{\|}{O}}{C}\diagup N—R^3—N\diagdown\underset{\overset{\|}{O}}{C}\diagup N-}{\overset{R_2-\!\!-\!\!-C=O\quad O=C-\!\!-\!\!-R^2}{|\qquad\qquad\qquad|}} \qquad (II)$$

in which $R^2$ represents an optionally substituted methylene radical and $R^3$ represents an unbranched alkylene radical with 1 to 12 C atoms which optionally contains an ether bridge, or $R^1$ represents a radical of the formula $$\underset{-N\diagdown\underset{\overset{\|}{O}}{C}\diagup N-\!\!\left[-CH_2-N\diagdown\underset{\overset{\|}{O}}{C}\diagup N-\right]_b}{\overset{O=C-\!\!-\!\!-R^4\ \left[\ R^4-\!\!-\!\!-C=O\right]}{|\qquad\qquad\quad|}} \qquad (III)$$

in which $b$ is 1 or 0 and $R^4$ represents a nitrogen-free divalent radical which is necessary to complete a five-membered or six-membered, unsubstituted or substituted ring, and (3) R denotes a divalent hydrocarbon radical with a total of 2 to 34 C atoms, which optionally contains one or more optionally substituted hydantoin groups or dihydrouracil groups and is optionally substituted, which is characterised in that a dicarboxylic acid of the formula $$HO·CO—(CH_2)_a—R^1—(CH_2)_a—CO·OH \qquad (VI)$$

in which $R^1$ and $a$ have the above meaning, or a derivative of this dicarboxylic acid which is suitable for polycondensations, is polycondensed in a manner which is in itself known with a diamine of the formula $$H_2N—R—NH_2 \qquad (VII)$$

in which R has the above meaning.

In addition to the dicarboxylic acids according to the formula (VI) it is also possible in each case, according to the invention, to employ the following derivatives of these dicarboxylic acids which are suitable for polycondensations: the acid dihalides (especially the dichlorides), the acid anhydrides, the dialkyl esters or the monoalkyl esters or the diaryl esters or the monoaryl esters of the dicarboxylic acids.

These derivatives of the dicarboxylic acids which are suitable for polycondensations can be manufactured according to generally known processes from the dicarboxylic acids. According to the invention, the dicarboxylic acids themselves, and the corresponding dicarboxylic acid esters, are preferably employed.

If dicarboxylic acids in which $R^1$ in the formula (VI) denotes a radical of the formula (II) are employed according to the invention, the radical of the formula (II) is always a molecular residue containing two hydantoin rings. The use of such dicarboxylic acids containing two hydantoin rings represents a preferred form of the process according to the invention.

In the formula (II), $R^2$ in particular denotes one of the radicals

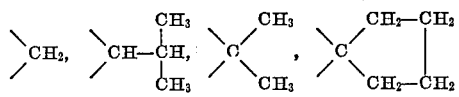

and

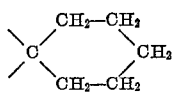

$R^3$ preferably represents methylene, polymethylene with 2 to 12 carbon atoms or the $$-CH_2-CH_2-O-CH_2-CH_2-$$

radical.

If $R^1$ in the formula (VI) denotes a radical of the formula (III), it can be either a dicarboxylic acid containing one hydantoin ring or dihydrouracil ring, of the formula

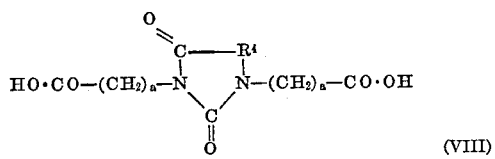

(VIII)

or a dicarboxylic acid containing two hydantoin rings or dihydrouracil rings, of the formula

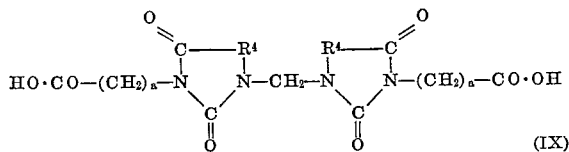

(IX)

The use of these two possible types of dicarboxylic acid (formula VIII and IX) denotes two further preferred forms of the present invention.

Depending on whether the dicarboxylic acids or the corresponding dicarboxylic acid derivatives according to the formulae (VIII) and (IX) contain dihydrouracil groups or hydantoin groups, $R^4$ in particular has the meaning of

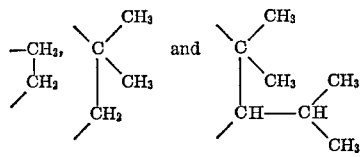

or the meaning of $R^2$ or of the radical

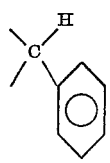

In the process according to the invention, preferably those diamines are employed in which the radical R in the formula (VII) denotes an unbranched polymethylene radical with 2 to 10 carbon atoms, 2,2,4-trimethylhexamethylene or 2,4,4-trimethylhexamethylene. Thus examples to be mentioned here are ethylenediamine, propylenediamine, hexamethylenediamine, 2,2,4-trimethylhexamethylenediamine and 2,4,4 - trimethylhexamethylenediamine. Diamines of the formula (VII) in which R represents one of the radicals

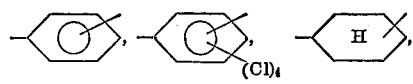

and

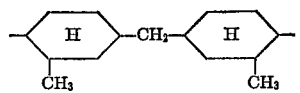

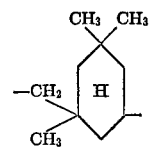

are also particularly suitable for the polycondensation.

As examples there may here be mentioned the phenylenediamines, the cyclohexamethylenediamines and isophoronediamine.

The use, according to the invention, of diamines of the formula (VII) in which R represents a radical of the formula $$-(CH_2)_c-R^5-(CH_2)_c- \quad (V)$$

in which $c$ denotes 2 or 3 and $R^5$ has the definition of $R^1$ and can in each case be the same as $R^1$ in the formula (I) or different from $R^1$ in the formula (I), is also particularly interesting. This procedure leads to polyamides which contain N-heterocyclic groups both in the parts of the molecule which originate from the dicarboxylic acids and in the parts of the molecule which originate from the diamines. Since such polyamides are relatively heat-stable but nevertheless still readily processable, the procedure last described also represents a preferred form of this invention.

Where R represents a radical of the formula (V) the diamines of the formula (VII) employed according to the process of the invention are manufactured according to various processes depending on the meaning of $R^5$ or $R^1$. If $R^5$ denotes a radical of the formula (II), the corresponding diamines are manufactured by hydrogenation of corresponding bis - ($\beta$-cyanoethyl) - hydantoins according to U.S. Pat. 3,725,342. On the other hand, those diamines employed according to the invention which only contain one heterocyclic ring and in which therefore $R^5$ in the formula (V) corresponds to the formula (III) and $b$ is identical to 0 can be manufactured conveniently by cyanoethylation of a corresponding hydantoin or a corresponding uracil or dihydrouracil and subsequent catalytic hydrogenation according to U.S. Pats. 3,635,844 and 3,644,365.

Diamines which contain, as $R^5$, a radical of the formula (III) possessing 2 heterocyclic rings, and which can also be employed according to the invention, can also be manufactured in a simple manner by cyanoethylation of a corresponding bishydantoin and subsequent hydrogenation (U.S. Pat. 3,635,845). The synthesis of analogous diamines possessing 2 dihydrouracil rings is carried out in an equivalent manner using corresponding bis-uracils or bis-dihydrouracils.

The following compounds may be listed as typical diamines, containing N-heterocyclic structures, which can be employed in the process according to the invention:

1,3-di-(γ-aminopropyl)-5,5-dimethylhydantoin,
1,1'-methylene-bis-3-(γ-aminopropyl)-5-isopropylhydantoin,
β,β'-di-(1-(γ-aminopropyl)-5,5-dimethylhydantoinyl-3)-diethyl ether,
1,3-di-(γ-aminopropyl)-5,5-dimethyl-5,6-dihydrouracil and
1,3-di-(γ-aminopropyl)-5,5-pentamethylenehydantoin.

The dicarboxylic acids of the formula (VI) employed according to the process of the invention are obtained, in the case that $a=2$, in a known manner by cyanoethylating corresponding mononuclear or binuclear N-heterocyclic compounds (hydantoin derivatives or dihydrouracil derivatives) by addition of 2 molecules of acrylonitrile to the two NH groups of the nuclei concerned and hydrolysing the resulting di-(β-cyanoethyl) derivatives to the dicarboxylic acid. As regards further details of the methods, reference should be made to the following literature: Chemical Abstracts, volume 55 (1961), column 2,689 and 17,655, Publication by Masatsune Sato in Journal of the Chemical Society of Japan 83 (1962), 318–327 (86–95).

Where dicarboxylic acids of the formula (VI) in which $a$ denotes the number 1 are employed, they are manufactured by condensation (with elimination of hydrogen halide) of the corresponding mononuclear or binuclear heterocyclic compounds with halogenoacetic acid in the molar ratio of 1:2, in the presence of alkalis.

The following substances may be listed as typical dicarboxylic acids or dicarboxylic acid derivatives which can be employed in the process according to the invention:

1,3-di-(carboxyethyl)-5,5-dimethylhydantoin,
1,3-di-(carboxyethyl)-5,5-dimethyl-5,6-dihydrouracil,
1,1'-methylene-bis-(3-methoxycarboxymethyl-5,5-dimethylhydantoin) and
1,3-di-(carboxyethyl)-5,5-pentamethylenehydantoin.

The polycondensation according to the process of the invention takes place in a manner which is in itself known, such as has been described, for example, in the specialist book "Synthetische Fasern aus Polyamiden" ("Synthetic Fibres from Polyamides") by Hermann Klare, Akademie-Verlag, Berlin 1963.

If starting from the dicarboxylic acids themselves, the known "AH-salt process" can in many cases advantageously be employed, that is to say the double salt of the dicarboxylic acid and the diamine is first manufactured and thereafter the actual polycondensation is carried out. Details of this double salt process and of the advantages thereof are described, for example, on pages 98–100 in the specialist book by Hermann Klare which has already been mentioned.

If the process according to the invention starts from dicarboxylic acids, dicarboxylic anhydrides or the double salts, water is eliminated in the course of the polycondensation. If, on the other hand, dialkyl esters or diaryl esters are employed, the corresponding alkyl alcohol or the corresponding phenol are eliminated during the polycondensation.

On the other hand, if monoalkyl esters or monoaryl esters are employed, water and alcohol or phenol, respectively, are eliminated simultaneously. If the process starts from acid dichlorides, hydrogen chloride is eliminated.

Since the polycondensation process is an equilibrium reaction, it is necessary for the manufacture of polyamides of higher molecular weight that the low molecular product eliminated during the polycondensation should be removed continuously.

According to the invention, the reaction can be carried out under normal pressure or under excess pressure. Finally, the remainder of the substances eliminated during the condensation is removed by means of reduced pressure.

In principle, the condensation processes which can be used according to the present invention can be carried out in the melt or in solution. In the latter case, the starting substances are in the form of a solution in an organic solvent or in water. Frequently, as for example in the case of the double salt process, the reaction is first carried out in solution, the solvent or the water are evaporated off as the polycondensation proceeds and the end product is finally obtained in the form of a melt.

It is also possible first to manufacture a pre-condensate in solution, then to isolate this by filtration and finally to complete the polycondensation in the melt. Usually, a granulation is subsequently carried out.

If an acid dichloride is used as the starting material according to the invention, there is a further possible way of carrying out the reaction, namely that of interfacial condensation. In this process, which is in itself known, the acid dichloride is present in a water-immiscible organic solvent and the diamine is present in aqueous solution.

As is known, the elimination of the various low molecular compounds during the polycondensation can be forced by means of polycondensation catalysts. For example, the following catalysts can be employed for the elimination of hydrogen chloride in the case that acid dichlorides are employed: tertiary amines, phosphonium salts, sulphonium salts, hydrazinium salts and the corresponding hydroxides; metal-acid esters, such as alkyl titanates and alkyl vanadates. Ammonium compounds of tertiary amines can also be employed.

If the dicarboxylic acids or the corresponding alkyl esters or aryl esters are employed, the polycondensation can be forced by known esterification catalysts or transesterification catalysts. Examples to be mentioned here are the acetates and oxides of Cd, Zn, Pb, Co, Mg, Ge and Sb. Metal-acid esters, such as titanates and vanadates, are also suitable.

The concentration of catalysts should be about 0.01 to 2 mol percent relative to the acid component.

When using the process according to the invention, it is desirable to add chain regulators to the reaction mixture. Regarding this technique, reference should be made to the specialist book by Hermann Klare already quoted, especially on page 193–196.

The end groups of the chain molecules (formula I) are different depending on the choice of the ratio of the amounts of the starting components in the reaction mixture and on the choice of the particular chain regulators used. Possible end groups are the —NH₂— group, the —CO·OH— group and acid radical groups. If, for example, acetic acid is used as the chain regulator the molecular residue CH₃·CO— occurs as the end group.

Since elevated temperatures are used in the process according to the invention it is necessary to work under a protective gas, preferably under nitrogen.

EXAMPLE 1

(a) Manufacture of the Double Salt

A solution of 69.0 g. of 1,3-di(carboxyethyl)-5,5-dimethylhydantoin (0.254 mol) in 250 ml. of tetrahydrofurane is stirred at —45° C. with a very fast-running stirrer. A solution of 29.5 g. of hexamethylene diamine in 150 ml. of tetrahydrofurane is run into this mixture over the course of 15 minutes. A finely granular, colourless crystalline material precipitates, which is separated off by filtration. It is dried over $P_2O_5$ at 25° C. and 0.15 mm. Hg. 99 g. of a colourless hygroscopic fine powder which melts at 194–196° C. and still contains traces of tetrahydrofurane are obtained. The elementary analysis shows:

| Calculated: | Found: |
|---|---|
| 52.56% C | 52.45% C |
| 8.30% H | 8.38% H |
| 14.42% N | 14.21% N |

The infrared spectrum (material ground with Nujol) shows, inter alia, absorptions at 2,730 cm.$^{-1}$, 2,670 cm.$^{-1}$, 2,560 cm.$^{-1}$, 2,120 cm.$^{-1}$, 1,770 cm.$^{-1}$ and 1,710 cm.$^{-1}$. Accordingly, the double salt has the following structure:

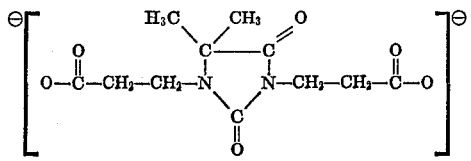

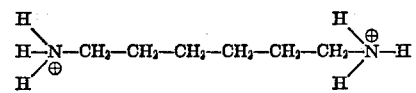

(b) Polycondensation 50 g. of the double salt manufactured according to 1(a) are fused (200° C.) under nitrogen in a glass apparatus with descending condenser and subsequently stirred for 2 hours at this temperature under normal pressure. Thereafter the mixture is stirred for a further hour at 248° C. The hot, clear, highly viscous melt is poured out onto a metal sheet to cool. A solid, clear polyamide which is coloured light yellow and which softens at about 100° C. is obtained in quantitative yield. The numerical average molecular weight determined by vapour pressure osmometry (Mechrolab Mod. 302 B of Hewlett-Packard; measured in dimethylformamide at 130° C. as a function of the concentration) shows $\overline{M}_n$=1,900. The microanalysis shows a nitrogen content of 15.5% (theory 15.9%). Accordingly, the new polyamide essentially consists of the following base units:

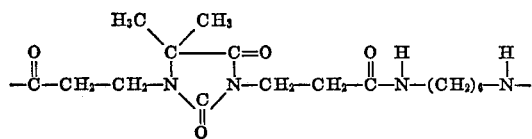

(c) A mixture of 27.4 g. of 1,3-di(carboxyethyl)-5,5-dimethyl-hydantoin (0.1 mol) and 11.8 g. of hexamethylenediamine (0.102 mol) is treated in accordance with the following programme:

4 hrs./180–200° C./N$_2$ normal pressure
16 hrs./210° C./0.1 mm. Hg
1 hr./230° C./0.1 mm. Hg A light yellow polyamide which softens at 200° C. is obtained in quantitative yield.

The microanalysis shows a nitrogen content of 15.5% (theory 15.9%).

EXAMPLE 2

(a) Manufacture of the Double Salt

The double salt is manufactured according to Example 1(a) from 183.5 g. of 1,3-di-(γ-aminopropyl)-5,5-dimethyl-hydantoin (0.75 mol) in 600 ml. of tetrahydrofurane and 206 g. of 1,3-di(carboxyethyl)-dimethylhydantoin in 1 l. of tetrahydrofurane. The isolation and drying are also carried out according to Example 1(a). A colourless fine crystalline material which melts at 151.2° C. (Mettler FP 51/1° C. per minute) is obtained in quantitative yield (389.5 g.).

(b) Polycondensation 50 g. of the double salt manufactured according to Example 2(a) (0.0963 mol) are mixed with 2.5 g. of lead-II oxide and fused at 175° C. Thereafter the mixture is stirred whilst observing the following temperature-pressure programme:

1 hr./175–180° C./15 mm. Hg
+1 hr./180° C./0.05 mm. Hg
+17 hrs./220–230° C./0.075 mm. Hg After cooling, the product is dissolved in 250 ml. of boiling chloroform, the solution is clarified by filtration and the product is reprecipitated from 2.5 l. of ether. After drying, initially at 15 mm. Hg and 20° C. over P$_2$O$_5$ and then at 0.2 mm. Hg/20° C., a yellowish powder, which softens at 121° C. is obtained in quantitative yield; its numerical average molecular weight $\overline{M}_n$=2,700 (measured in CHCl$_3$ at 32.5° C., vapour pressure osmometry). The new polyamide consists essentially of the following base units:

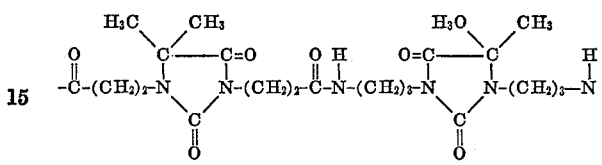

EXAMPLE 3

A solution of 164.2 g. of diethyl ester of 1,3-di-(carboxyethyl)-5,5-dimethylhydantoin (0.5 mol) and 129.5 g. of 1,3-di-(γ-aminopropyl)-5,5-dimethyl-5,6-dihydrouracil (0.5 mol) in 200 ml. of dimethylformamide is stirred for 12 hours at 115° C. whilst distilling off ethanol. Thereafter the mixture is stirred for a further 4 hours at 150° C. The reaction mixture is filtered and concentrated to dryness and the product is then reprecipitated from alcohol/ether. Thereafter it is dried to constant weight under a high vacuum at 60° C. 98.8 g. (37% of theory) of a very highly viscous dark resin are obtained, consisting essentially of the following base unit:

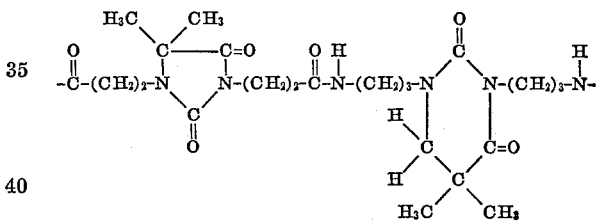

EXAMPLE 4

50 g. of the double salt manufactured according to Example 2(a) are mixed with 2 g. of anhydrous aluminium trichloride and warmed to 175° C. over the course of 150 minutes whilst stirring and distilling off water. A vacuum of 15 mm. Hg is then applied and the temperature is gradually raised to 243° C. over the course of 6½ hours. The resulting light ochre-coloured, viscous melt is cooled and precipitated from ethanol/petroleum ether. This operation is repeated. The product is dried to constant weight at 60° C./0.1 mm. Hg. 25.2 g. of a colourless powdery polyamide which has the same base unit as the polymer manufactured according to Example 2(b) are obtained. The numerical average molecular weight $\overline{M}_n$=2,240 (vapour pressure osmosis, 32.5° C., in CHCl$_3$).

EXAMPLE 5

50 g. of the double salt used in Example 4, together with 1.5 g. of lead-II oxide, 0.5 g. of zinc octoate and 1.0 g. of tetraisopropyl titanate are treated in accordance with the following programme:

2.5 hrs./160° C./normal pressure
2.5 hrs./185° C./normal pressure
10 hrs./200 C./0.2 mm. Hg
8 hrs./245° C./0.2 mm. Hg 40 g. of crude product are obtained. This is dissolved in 500 ml. of DMF at 130° C., the solution is clarified by filtration and the product is reprecipitated from 5 l. of dioxane. A polyamide having the base unit according to Example 2(b) and possessing a numerical average molecular weight of 3,630 is obtained.

EXAMPLE 6

A mixture of 143.0 g. of the diethyl ester of 1,3-di(carboxyethyl)-4,5-dimethyl-5,6 - dihydrouracil (0.418 mol) and 48.5 g. of hexamethylenediamine (0.418 mol) is stirred for 16 hours at 110° C. whilst distilling off ethanol. The mixture is then stirred for a further 4 hours at 146–160° C. under normal pressure. 158.8 g. of a highly viscous polyamide (92.2% of theory) consisting essentially of the following base unit are obtained:

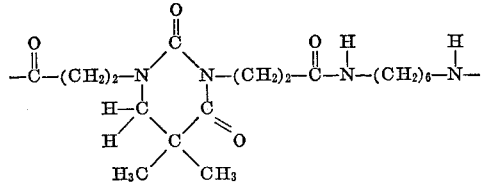

EXAMPLE 7

30 g. of 1,1'-methylene-bis-(3-methoxycarboxy-methyl-5,5-di-methylhydantoin) (0.0727 mol) together with 8.45 g. of hexamethylenediamine and 0.1 g. of lead-II oxide, 0.1 g. of antimony-III oxide and 0.1 g. o f tetraisopropyl titanate are polycondensed in accordance with the following programme whilst stirring and eliminating methanol.

2 hrs./130–200° C./$N_2$ normal pressure
2 hrs./220° C./$N_2$ normal pressure
1 hr./228° C./15 mm. Hg
5 hrs./260–272° C./0.2 mm. Hg 29.5 g. of the resulting crude product are dissolved in 400 ml. of hot DMF, the solution is clarified by filtration and the product is precipitated from 2.5 l. of water. It is dried over $P_2O_5$ at 25° C. under 0.05 mm. Hg. A polyamide having the following molecular base unit is obtained:

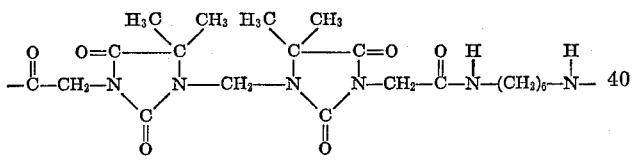

EXAMPLE 8

A mixture of 23.5 g. of 3,3'-dimethyl-4,4'-diamino-dicyclo-hexylmethane ("Laromin C 260") (0.0987 mol), 30.8 g. of 1,3-di-(carboxyethyl)-5,5 - pentamethylenehydantoin (0.0987 mol), 0.2 g. of lead-II oxide, 0.1 g. of antimony-III oxide and 0.1 g. of tetraisopropyl titanate is stirred for 4 hours at 150–220° C. under 15 mm. Hg. Thereafter the mixture is left to react for a further hour at 280° C./15 mm. Hg. 45 g. of a hard and tough, crude polyamide are obtained. This is dissolved in 400 ml. of boiling chloroform. The cooled solution is centrifuged and the product is precipitated from 2 l. of petroleum ether. The polyamide has the following molecular base unit:

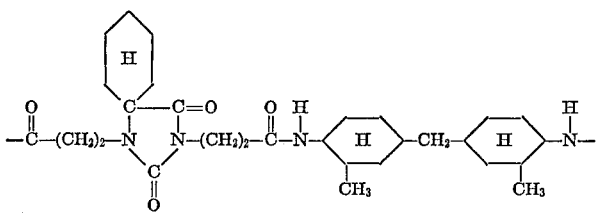

EXAMPLE 9

A mixture of 27.4 g. of 1,3-di(carboxyethyl)-5,5-dimethylhydantoin (0.1 mol) and 11.6 g. of 1,2-diaminocyclohexane (0.102 mol) is treated in accordance with the following programme:

2 hrs./170–190° C./$N_2$ normal pressure
2 hrs./195° C./$N_2$ normal pressure
2 hrs./225° C./ 15 mm. Hg.
2 hrs./225° C./0.1 mm. Hg A brown polyamide which softens at 175° C. and has a numerical average molecular weight of $\overline{M}_n=1,600$ (measured in $CHCl_3$ at 32.5° C., vapour pressure osmometry) is obtained in quantitative yield. The microanalysis shows a nitrogen content of 15.6% (theory 16.0%). The new polyamide essentially consists of the following base unit:

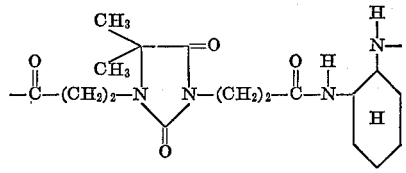

EXAMPLE 10

A mixture of 48.2 g. of 1,1'-hexamethylene-bis-(3-carboxy-5,5-dimethylhydantoin) (0.1 mol) and 11.0 g. of 1,4-phenylenediamine (0.102 mol) is treated in accordance with the following programme:

1 hr./150–190°/$N_2$ normal pressure
3 hrs./195° C./$N_2$ normal pressure
3 hrs./200° C./15 mm. Hg
12 hrs./200° C./0.1 mm. Hg A brown polyamide which softens at 160° and has a numerical average molecular weight of $\overline{M}_n=6,000$ (measured in $CHCl_3$ at 32.5° C., vapour pressure osmometry) is obtained in quantitative yield. The microanalysis shows a nitrogen content of 14.9% (theory 15.2%). The new polyamide consists essentially of the following base unit:

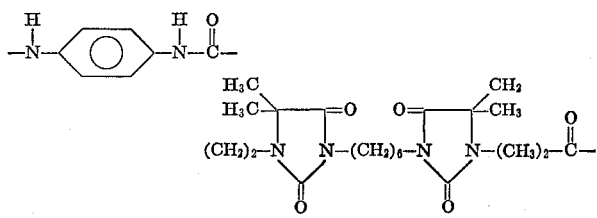

EXAMPLE 11

A mixture of 48.2 g. of 1,1'-hexamethylene-bis-(3-carboxyethyl-5,5-dimethylhydantoin) (0.1 mol) and 11.8 g. of hexamethylenediamine (0.102 mol) is treated in accordance with the following temperature-pressure programme:

15 hrs./195° C./$N_2$ normal pressure
6 hrs./200° C./0.1 mm. Hg
1 hr./230° C./0.01 mm. Hg A light yellow polyamide which softens at approx. 100° C. and has a numerical average molecular weight of $\overline{M}_n=4,000$ (measured in $CHCl_3$ at 32.5° C., vapour pressure osmometry) is obtained in quantitative yield. The microanalysis shows a nitrogen content of 14.6% (theory 14.9%). The new polyamide consists essentially of the following base units:

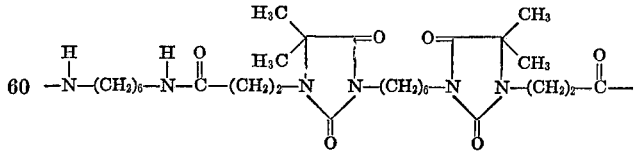

EXAMPLE 12

A mixture of 48.2 g. of 1,1'-hexamethylene-bis-(3-carboxyethyl-5,5-dimethylhydantoin) (0.1 mol) and 15.8 g. of an isomer mixture consisting of 2,2,4,(2,4,4)-trimethylhexamethylenediamine is treated in accordance with the following programme:

1 hr./190° C./$N_2$ normal pressure
2 hrs./190° C./15 mm. Hg
14 hrs./190° C./0.05 mm. Hg
1 hr./220° C./0.05 mm. Hg
2 hrs./240° C./0.05 mm. Hg
0.25 hrs./265° C./0.05 mm. Hg A light yellow polyamide which softens at 90° C and has a numerical average molecular weight $\overline{M}_n=4,500$ (measured in $CHCl_3$) is obtained in quantitative yield. The microanalysis shows a nitrogen content of 13.8% (theory 13.9%). The new polyamide consists essentially of the following base units:

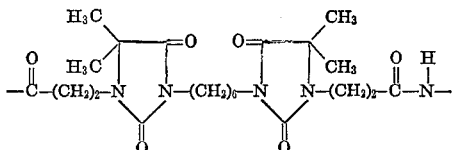

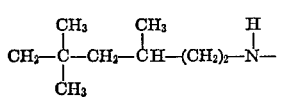

EXAMPLE 13

A mixture of 32.8 g. of the diethyl ester of 1,3-di-(carboxyethyl)-5,5-dimethylhydantoin (0.1 mol) and 12.2 g. of hexamethylene-diamine (0.105 mol) is treated in accordance with the following programme:

4 hrs./100–180° C./$N_2$ normal pressure
4 hrs./180° C./15 mm. Hg
15 hrs./160° C./1 mm. Hg
1 hr./190° C./1 mm. Hg
2 hrs./210° C./1 mm. Hg A brown product which softens at 118° C. is obtained in quantitative yield.

The microanalysis shows a nitrogen content of 16.1% (theory 15.9%). The resulting polyamide accordingly has essentially the following base units:

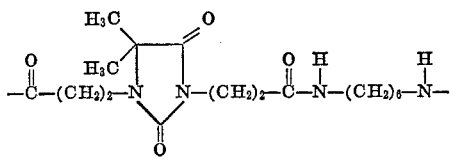

EXAMPLE 14

27.39 g. of the 1,3-di-(carboxyethyl)-5,5-dimethyl-hydantoins (0.1 mol) used in Example 1 and 11.83 g. of hexamethylenediamine (0.102 mol) are directly introduced into a 200 ml. glass apparatus with descending condenser, thermometer and stirrer. Water is distilled off for 4 hours under normal pressure at 200–220° C. bath temperature whilst spraying in nitrogen, and in the course of the distillation the reaction temeperature rises from 180 to 206° C. Thereafter the condensation is continued for 12 hours at 215° C. reaction temperature under a vacuum of 0.15 mm. Hg and subsequently the mixture is further treated for 1 hour at 230° C./0.15 mm. Hg. The product is cooled under nitrogen, dissolved in dimethylsulphoxide and precipitated from water. Drying is carried out for 120 minutes at 200° C./0.2 mm. Hg. A light ochre-coloured polyamide which softens at approx. 250° C. is obtained. Its molecular weight $\overline{M}_n$, estimated from the viscosity $\eta_{spec./c}=1.345$ is ~10,600 and the average degree of polycondensation $n$ is ~30. The nitrogen content is 15.5% (calculated, 15.9%).

The base unit of this polyamide is identical with that manufactured according to Example 1(b).

USE EXAMPLES

Example 1

The heat stability of the polyamide obtained according to Example 14 is determined by means of thermogravimetric analysis.

Start of decomposition in—
Air ............................................. } 1%/min. { At 268° C.
$N_2$ ............................................. } { At 263° C.
Maximum speed of decomposition in—
Air ............................................. At 320–405° C.
$N_2$ ............................................. At 331–415° C.

What we claim is:
1. A polyamide of formula

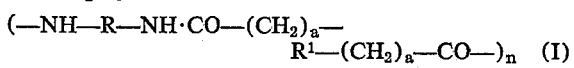

in which (1) $n$ denotes a number from 2 to 200 and $a$ denotes 1 or 2, (2) $R^1$ denotes a radical of the formula

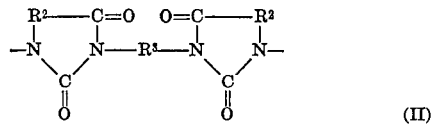

in which $R^2$ represents a methylene radical and $R^3$ represents an unbranched alkylene radical with 1 to 12 carbon atoms which may be interrupted by an ether bridge, or $R^1$ represents a radical of the formula

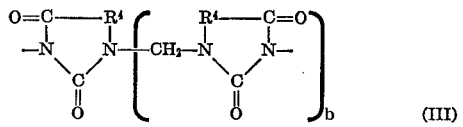

in which $b$ is 1 or 0 and $R^4$ represents a divalent radical which is necessary to complete a five-membered or six-membered ring, selected from the group consisting of

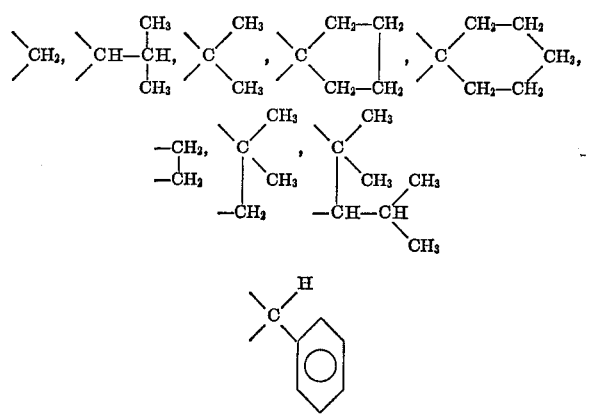

and (3) R denotes a divalent hydrocarbon radical with a total of 2 to 34 carbon atoms, which may contain hydantoin groups or dihydrouracil groups.

2. The polyamide according to Claim 1, characterised in that $R^1$ represents a radical of the formula (II) in which $R^2$ and $R^3$ have the above meaning.

3. The polyamide according to Claim 1, characterised in that $R^1$ represents a radical of the formula

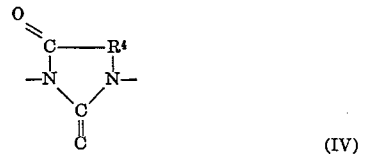

in which $R^4$ has the above meaning.

4. The polyamide according to Claim 1, characterised in that $R^1$ represents a radical of the formula (III) and therein $R^4$ has the above meaning, and $b$ denotes the number 1.

5. The polyamide according to Claim 1, characterised in that $R^2$ denotes one of the radicals selected from the group consisting essentially of

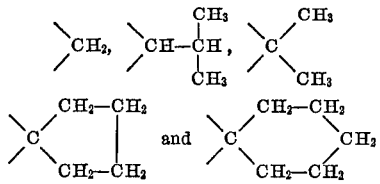

6. The polyamide according to Claim 5, characterised in that $R^2$ denotes one of the radicals selected from the group consisting essentially of

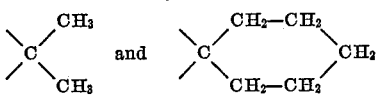

7. The polyamide according to Claim 1, characterised in that $R^3$ represents methylene, polymethylene with 2 to 12 carbon atoms or the —$CH_2$—$CH_2$—O—$CH_2$—$CH_2$ radical.

8. The polyamide according to Claim 1, characterised in that $R^1$ denotes a radical of the formula

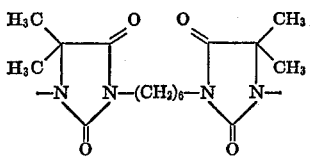

9. The polyamide according to Claim 1, characterised in that $R^4$ denotes one of the radicals selected from the group consisting essentially of

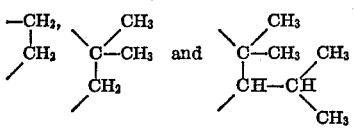

10. The polyamide according to Claim 1, characterised in that $R^4$ has the meaning of $R^2$ or represents the radical

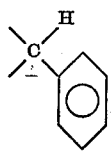

11. The polyamide according to Claim 1, characterised in that $R^4$ denotes one of the radicals selected from the group consisting essentially of

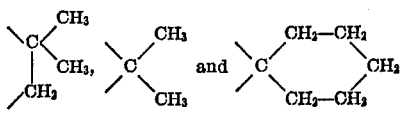

12. The polyamide according to Claim 1, characterised in that R represents an unbranched polymethylene radical with 2 to 10 carbon atoms, 2,2,4-trimethylhexamethylene or 2,4,4-tri-methylhexamethylene.

13. The polyamide according to Claim 12, characterised in that R denotes one of the radicals —$(CH_2)_6$— and

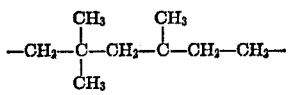

14. The polyamide according to Claim 1, characterised in that R represents one of the radicals selected from the group consisting essentially of

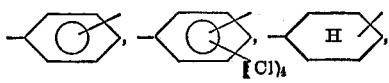

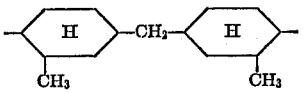

and

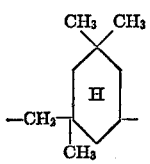

15. The polyamide according to Claim 14, characterised in that R denotes one of the radicals selected from the group consisting essentially of

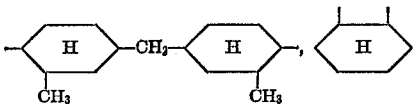

and

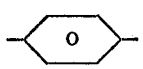

16. The polyamide according to Claim 1, characterised in the R represents a radical of the formula $$—(CH_2)_c—R^5—(CH_2)_c— \quad (V)$$

in which $c$ denotes 2 or 3 and $R^5$ has the definition of $R^1$ and in each case can be the same as $R^1$ in the formula (I) or different from $R^1$ in the formula (I).

17. The polyamide according to Claim 16, characterised in that in the formula (V) $c$ denotes the number 3 and $R^5$ denotes one of the radicals

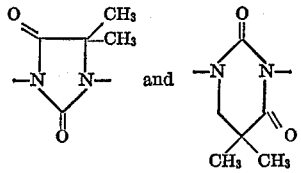

18. The polyamide according to Claim 16, characterised in that $R^1$ in the formula (I) contains one or more optionally substituted hydantoin groups and $R^5$ contains one or more optionally substituted dihydrouracil groups, or conversely that $R^1$ in the formula (I) contains one or more optionally substituted dihydrouracil groups and $R^5$ contains one or more optionally substituted hydantoin groups.

19. The polyamide according to Claim 1, characterised by numerical average molecular weights of 500 to 50,000 and by softening ranges from room temperature to 250° C.

References Cited
UNITED STATES PATENTS

| | | | |
|---|---|---|---|
| 3,484,407 | 12/1969 | Preston | 260—47 |
| 3,527,732 | 9/1970 | Wolf et al. | 260—47 |
| 3,671,614 | 6/1972 | Kunzel et al. | 260—47 |

LESTER L. LEE, Primary Examiner

U.S. Cl. X.R.

117—161 P; 260—32.6 N, 33.8 R, Dig. 34